UNITED STATES PATENT OFFICE.

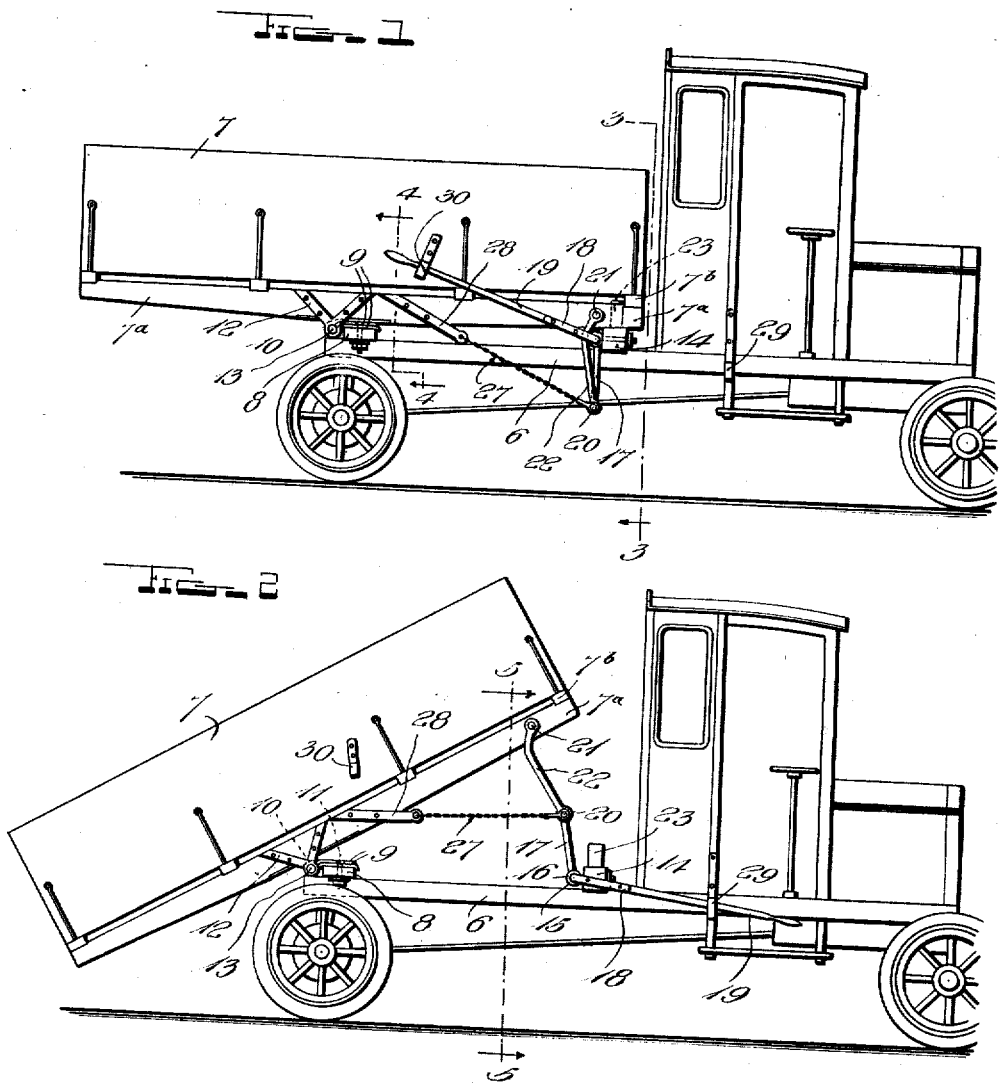

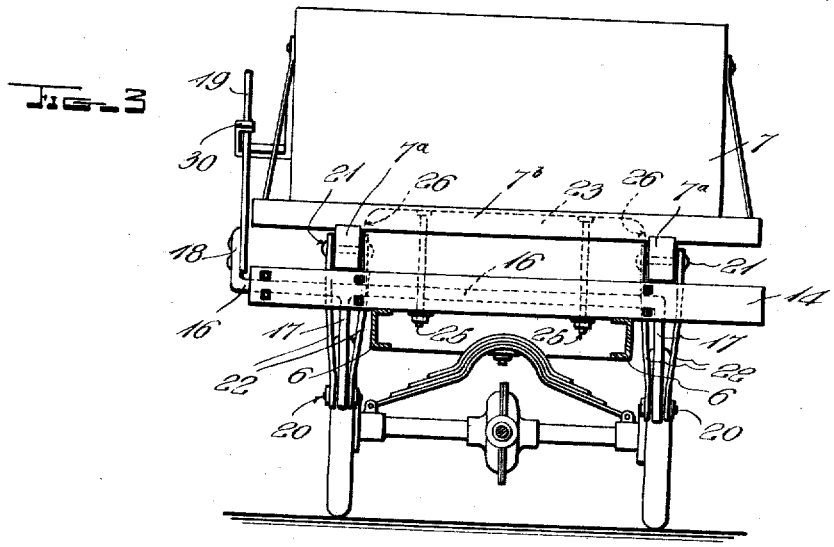
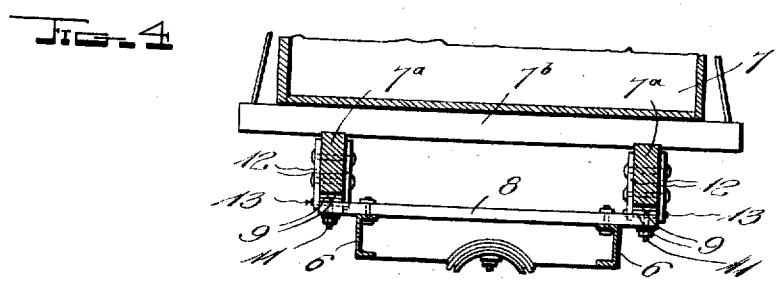
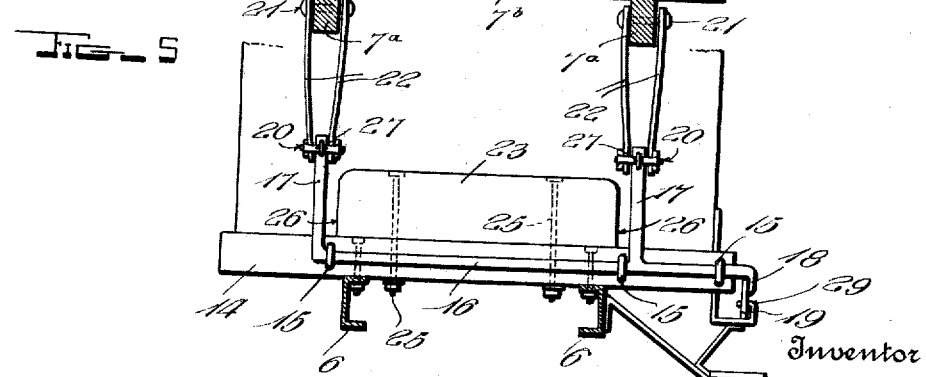

HERMAN UHLRIG, OF WAMEGO, KANSAS.

DUMPING MECHANISM FOR AUTOMOBILE TRUCKS.

1,301,338.  Specification of Letters Patent.  Patented Apr. 22, 1919.

Application filed August 8, 1918. Serial No. 248,918.

*To all whom it may concern:*

Be it known that I, HERMAN UHLRIG, a citizen of the United States, residing at Wamego, in the county of Pottawatomie and State of Kansas, have invented certain new and useful Improvements in Dumping Mechanism for Automobile Trucks; and I do declare the following to be a full, clear, and exact description of the invention, such as will enable others skilled in the art to which it appertains to make and use the same.

This invention relates to dumping wagons, and it relates more specifically to an improved dumping mechanism for automobile trucks.

One object of this invention is to provide a practical, efficient and unfailing means whereby a heavy load can be quickly dumped by manual power;

Another object is to provide a device of this character which supports the body or box of the truck or vehicle, independently of the manual power, while in its dumping position;

Another object is to provide a dumping mechanism which securely holds the body in its normal or non-dumping position while traveling or while being loaded;

Another object is to provide a pair of combined pivotal and non-pivotal supporting elements by which the greater portion of the load is supported so that the pivotal supporting element is relieved of the weight and shock-strains when the vehicle is traveling or is being loaded;

Another object is to provide practical and efficient means for protecting the dumping mechanism from lateral strains;

Another object is to provide a mechanism of this character which is strong, durable, simple of construction and operation, can be manufactured at a comparatively low cost and may be applied to any automobile truck of ordinary construction.

Other objects and advantages may become apparent to persons who read the following details of description in connection with the accompanying drawings in which—

Figure 1 is a side elevation of an automobile frame or chassis and base or body provided with my improved dumping mechanism, the parts being shown in a normal or non-dumping position;

Fig. 2 is a similar view except that the parts are shown in the dumping position;

Fig. 3 is a transverse vertical sectional view, the section being taken substantially along the line 3—3 of Fig. 1;

Fig. 4 is a fragmentary detail, in transverse vertical section substantially along the line 4—4 of Fig. 1; and, Fig. 5 is a detail view in transverse vertical section along the line 5—5 of Fig. 2, the parts being shown in the dumping position.

Referring to these drawings in detail in which similar reference characters correspond with similar parts throughout the several views the automobile chassis or supporting frame 6 may be of any ordinary construction, and the same is true of the box or body 7, and these parts will not be described in detail.

Upon the inner end of the chassis 6 is secured a supporting beam 8 which extends transversely over the chassis and extends beyond the sides thereof. Upon the laterally projecting ends of the beam 8 is secured a pair of combined pivotal and non-pivotal supporting elements or plates 9 having bearings or hinge elements 10 formed integrally therewith. These plates 9 are secured to the beam 8 by any appropriate securing means, such as bolts and nuts indicated at 11. A second pair of hinge elements 12 is secured to the base or body 7, and one or more pivot elements 13 unite with the elements 10 and 12 to form hinges on which the body 7 may be tilted for dumping its contents. However, when the box or body 7 is being loaded or is traveling, its weight is supported entirely independently of the hinge elements, the plates 9 bearing the greater portion of the weight of the body and its contents. The front end of the body 7 is supported by a beam 14 which is secured to the chassis 6 forwardly of the beam 8, and this beam 14 has its ends projecting laterally over and beyond the sides of the chassis. The beams 8 and 14, therefore, combine to support the weight of the box or the body and its contents. Moreover, this beam 14 is provided with bearings 15 in which is journaled a rock-shaft 16 having a pair of parallel arms 17 and an arm 18. On the latter of these arms is secured a handle bar or actuating element 19, and it will be seen that the elements 16 to 19 inclusive combine to form a lever which is fulcrumed or pivotally mounted in the bearings 15. Pivots or pivot elements 20 and 21 are engaged respectively with the arms 17 and the body 7, and two pairs of links 22 connect the arms 17 with the box or body 7 through the medium of the pivots 20 and 21. Although I might dispense with one link 22 of each pair, or might otherwise modify the connection between the rock-shaft 16 and body 7, the mechanism illustrated in Figs. 3 and 5 of the drawings is the preferred embodiment of my invention. In the foregoing description of the connection between the shaft 16 and box or body 7, it is to be understood that the longitudinal beams 7ª, through which the pivots 21 extend, are elements of the box or body 7.

The box or body 7 comprises cross beams 7ᵇ, the front one of which enters into the combination of the present invention, as will now be described. Upon the beam 14 is secured a block or bar 23 which is of the length approximately equal to the distance between the beams 7ª. This block is secured to the beam 14 by means of bolts 25, and its ends 26 constitute abutments or shoulders against which the inner sides of the beams 7ª press when the body 7 tends to move laterally. The forward side of the block 23 engages with the cross front beam 7ᵇ when the body 7 tends to move rearward, and the inner links 22 engage with the rear side of the block 23 when the body 7 tends to move forward.

To the pivots 20 are secured two chains or flexible elements 27, and the rear ends of these flexible elements are secured to the body 7 through the medium of apertured straps 28. Each element 27 and the corresponding element 28 may be considered as a unitary flexible element, and each of these elements constitutes a means for limiting the forward movement of the contiguous pivot 20. In other words, the flexible element 27—28 combines with the shaft 16 and pivot elements 21 to hold the pivots 20 in a position slightly forward of the common axial plane of the shaft 16 and pivot elements 21. This feature of the invention is of very great importance, for it enables the front end of the body 7 to be supported by the manually operable dumping mechanism entirely independently of any manual power or effort, as it will be obvious from a careful observation of Fig. 2.

In dumping the box, the handle 19 is swung from the position shown in Fig. 1 to that which is shown in Fig. 2, and the said handle is then engaged with a lug or keeper 29, and this prevents the handle from swinging upwardly, but no means is provided to prevent the handle from swinging downwardly except the flexible elements 27—28. Therefore, even if the handle should become disengaged from the keeper 29 the element 27—28 would prevent the return of the box to its normal position. Likewise when the box is in its normal position, the keeper 30 engages with the handle 19; but the links 22 and arms 17 securely hold the body in its normal position because the pivotal connections 16, 20 and 21 are substantially in alinement with one another.

Although I have described this embodiment of my invention very specifically, it is not intended to limit this invention to these exact details of construction and arrangement of parts, but I am entitled to make changes within the scope of the inventive idea as disclosed in the foregoing description and following claims.

What I claim as my invention is:

1. In a dumping vehicle comprising a supporting frame and a box mounted to be rocked on the frame; a lever fulcrumed on said frame, a link pivotally connected to said lever and to said box, and a flexible element connected to said box and to the pivotally connected lever and link, the said flexible element being just sufficiently long to coöperate with said box and lever in holding the said pivotal connection at a point slightly beyond the common axial plane of the fulcrum of said lever and the pivot that connects said link to said box, substantially as shown and described.

2. In a dumping vehicle comprising a supporting frame and a box mounted to be rocked on said frame; a rock-shaft mounted on said frame, an actuating element carried by said rock-shaft and operable to rock the latter, a pair of arms carried by said rock shaft, a link for each of said arms, pivots each connecting one of said links to a corresponding one of said arms, pivot elements whereby opposite sides of said box are connected to the respective links, and a flexible element connected to said box and to one of said pivots that connect said links to the arms, said flexible element having just the proper length between its connections for coöperating with the adjacent rock-shaft and pivot element in holding the contiguous pivot beyond the common axial plane of said rock-shaft and pivot element with relation to the point where said flexible element connects with said box.

3. In a dumping vehicle comprising a supporting frame and a box mounted to be rocked on said frame; a beam extending laterally across and supported by said frame and supporting the front end of said box, a lever, a bearing on said beam and pivotally supporting said lever, means on said beam to prevent horizontal movement of said box relative to the beam, a link, a pivot connecting said link to said lever, a pivot-element connecting said link to said box, and a flexible element connected to said box and to said pivotally connected lever and link in the proper relation to coöperate with said lever and link for holding their pivot beyond the common axial plane of said bearing and said pivot element with relation to the point where said flexible element connects with said box.

In testimony whereof I have hereunto set my hand.

HERMAN UHLRIG.

Witnesses:
E. M. BRUNNER,
W. C. BITTMANN,

Copies of this patent may be obtained for five cents each, by addressing the "Commissioner of Patents, Washington, D. C."